United States Patent
Jewell et al.

(10) Patent No.: US 10,960,469 B2
(45) Date of Patent: Mar. 30, 2021

(54) METHODS USING HIGH SURFACE AREA PER VOLUME REACTIVE PARTICULATE

(71) Applicant: Coogee Titanium Pty Ltd, Kwinana (AU)

(72) Inventors: Daniel Jewell, Kwinana (AU); Peter Duxson, Kwinana (AU)

(73) Assignee: Coogee Titanium Pty Ltd, Kwinana (AU)

( * ) Notice: Subject to any disclaimer, the term of this patent is extended or adjusted under 35 U.S.C. 154(b) by 0 days.

(21) Appl. No.: 15/540,751

(22) PCT Filed: Aug. 12, 2016

(86) PCT No.: PCT/AU2016/050747
§ 371 (c)(1),
(2) Date: Jun. 29, 2017

(87) PCT Pub. No.: WO2017/027916
PCT Pub. Date: Feb. 23, 2017

(65) Prior Publication Data
US 2018/0141128 A1 May 24, 2018

(30) Foreign Application Priority Data

Aug. 14, 2015 (AU) ................. 2015903279

(51) Int. Cl.
*B22F 9/22* (2006.01)
*C22B 5/04* (2006.01)
(Continued)

(52) U.S. Cl.
CPC .............. *B22F 9/22* (2013.01); *B01L 3/10* (2013.01); *B22F 1/0048* (2013.01); *B22F 1/02* (2013.01);
(Continued)

(58) Field of Classification Search
None
See application file for complete search history.

(56) References Cited

U.S. PATENT DOCUMENTS 3,746,535 A  7/1973  Brandstatter
3,779,742 A  12/1973  Fehling et al.
(Continued)

FOREIGN PATENT DOCUMENTS

CN  85100812 A  9/1986
CN  1522308 A  8/2004
(Continued)

OTHER PUBLICATIONS

Doblin, C. et al., "Titanium powder from the TiRO (TM) process", Key Engineering Materials, vol. 520, pp. 95-100, available online Aug. 24, 2012.*
(Continued)

*Primary Examiner* — George Wyszomierski
(74) *Attorney, Agent, or Firm* — Michael Best & Friedrich LLP

(57) ABSTRACT

A method of processing finely divided reactive particulates ($R_{Particulate}$) and forming a product comprising: providing a composite material comprising finely divided reactive particulates ($R_{Particulate}$) dispersed in a protective matrix; at least partially exposing the finely divided reactive particulates ($R_{Particulate}$); and forming the product.

15 Claims, 2 Drawing Sheets

(51) Int. Cl.
| | |
|---|---|
| *C22B 9/04* | (2006.01) |
| *C22B 34/12* | (2006.01) |
| *C22B 34/22* | (2006.01) |
| *C22C 1/04* | (2006.01) |
| *B22F 1/00* | (2006.01) |
| *B22F 1/02* | (2006.01) |
| *B01L 3/10* | (2006.01) |
| *B22F 3/10* | (2006.01) |

(52) U.S. Cl.
CPC .............. *B22F 3/1039* (2013.01); *C22B 5/04* (2013.01); *C22B 9/04* (2013.01); *C22B 34/1272* (2013.01); *C22B 34/22* (2013.01); *C22C 1/04* (2013.01)

(56) References Cited

U.S. PATENT DOCUMENTS

| | | | |
|---|---|---|---|
| 4,279,641 A | | 7/1981 | Skach, Jr. et al. |
| 4,738,389 A | * | 4/1988 | Moshier .................... B22F 3/23 228/148 |
| 5,032,176 A | | 7/1991 | Kametani et al. |
| 5,078,789 A | | 1/1992 | Abodishish |
| 5,098,471 A | | 3/1992 | Abodishish |
| 5,498,446 A | | 3/1996 | Axelbaum et al. |
| 5,589,274 A | | 12/1996 | Long et al. |
| 5,641,424 A | * | 6/1997 | Ziolo .................... B82Y 25/00 252/62.51 R |
| 5,958,106 A | | 9/1999 | Armstrong |
| 6,194,083 B1 | | 2/2001 | Yasuda et al. |
| 6,409,797 B2 | | 6/2002 | Armstrong |
| 6,712,952 B1 | | 3/2004 | Fray et al. |
| 7,041,150 B2 | | 5/2006 | Armstrong |
| 9,840,753 B2 | | 12/2017 | Jewell et al. |
| 2003/0059603 A1 | | 3/2003 | Gottfried et al. |
| 2004/0123700 A1 | | 7/2004 | Zhou et al. |
| 2007/0178163 A1 | * | 8/2007 | Kodas .................. B01J 13/0043 424/489 |
| 2008/0307925 A1 | | 12/2008 | Wellwood et al. |

FOREIGN PATENT DOCUMENTS

| | | |
|---|---|---|
| CN | 100489128 C | 5/2009 |
| CN | 101454467 | 6/2009 |
| CN | 100557044 C | 11/2009 |
| CN | 102712966 | 10/2012 |
| CN | 102921953 | 2/2013 |
| GB | 694921 A | 7/1953 |
| GB | 827470 A | 2/1960 |
| JP | H0681051 | 3/1994 |
| JP | H0873906 A | 3/1996 |
| JP | 2000096160 A | 4/2000 |
| JP | 2001192711 A | 7/2001 |
| JP | 2002129250 A | 5/2002 |
| JP | 2002339006 | 11/2002 |
| JP | 2004/283694 * | 10/2004 |
| JP | 2006045602 A | 2/2006 |
| JP | 2007523991 A | 8/2007 |
| JP | 2009132970 A | 6/2009 |
| KR | 20120074132 A | 7/2012 |
| WO | 2005028145 A2 | 3/2005 |
| WO | WO-2006042360 A1 | 4/2006 |
| WO | 2008067614 A1 | 12/2008 |
| WO | 2009054819 A1 | 4/2009 |
| WO | WO-2011137489 A1 | 10/2011 |
| WO | 2013185153 A2 | 12/2013 |

OTHER PUBLICATIONS

English translation of JP 2004-283694 (originally published Oct. 2004) from Espacenet.*
Traut, et al, "Coreduction of TiCl4, AlCl3, and VCl4 to Produce Titanium Alloy Sponge" Bureau of Mines Report of Investigations/ 1987, RI 9133 (22 pages).
Doblin, "Ongoing development of the TIRO process," CSIRO presentation, 28th Annual ITA Conference, Atlanta, Georgia, Oct. 7-10, 2012 (15 pages).
Evdokimov et al., "Magnesium Reduction of Titanium Tetrachloride," Inorganic Materials, 2002, 38:5; 490-493.
International Search Report and Written Opinion for Application No. PCT/AU2016/050747 dated Nov. 7, 2016 (9 pages).
Wellwood, "Low Cost Titanium Powder Processes to Facilitate Near Net Shape Manufacture," CSIRO presentation, 22nd Annual ITA Conference, San Diego, California, Oct. 1-3, 2006 (21 pages).
International Search Report and Written Opinion for Application No. PCT/AU2016/050745 dated Nov. 7, 2016 (10 pages).
International Search Report and Written Opinion for Application No. PCT/AU2016/050746 dated Nov. 7, 2016 (10 pages).
Supplementary European Search Report for related Application No. EP16836271 dated May 7, 2018 (2 pages).
Supplementary European Search Report dated Jul. 27, 2018 (2 pages).
Gong et al., "Melt Pool Characterization for Selective Laser Melting of Ti—6Al—4V Pre-alloyed Powder", Conference: 25th Annual International Solid Freeform Fabrication Symposium, 2014, pp. 256-267.
Joshi et al., "Development of Ti—6Al—4V and Ti—1Al—8V—5Fe Alloys Using Low-Cost TiH2 Powder Feedstock", Journal of Materials Engineering and Performance, vol. 22, No. 4, Sep. 2012, pp. 995-1003.
Guo Kui ed., "Introduction to Metallurgical Technology", Central South University Press, Aug. 31, 1991, pp. 340-350.
Chinese Patent Office Search Report for Application No. 201680058440X dated Aug. 20, 2019 (4 pages including statement of relevance).
Chinese Patent Office Search Report for Application No. 201600584772 dated Aug. 22, 2019 (4 pages including statement of relevance).
Japanese Patent Office Notice of Reasons for Refusal for Application No. 509590/2018 dated Jun. 2, 2020 (23 pages including English translation).
Japanese Patent Office Notice of Reasons for Refusal for Application No. 509595/2018 dated Jun. 2, 2020 (19 pages including English translation).
Japanese Patent Office Notice of Reasons for Refusal for Application No. 509594/2018 dated Aug. 11, 2020 (18 pages including English translation).

* cited by examiner

METHODS USING HIGH SURFACE AREA PER VOLUME REACTIVE PARTICULATE

FIELD OF INVENTION

The present invention relates to methods that employ high surface area per volume reactive particulates. The invention also relates to a composite material comprising the high surface area reactive particulates and the use of such composite materials. The composite material comprises the high surface area per volume reactive particulates dispersed in a protective matrix.

BACKGROUND ART

International Publication No. WO 2006/042360 provides a method for producing titanium by reaction of titanium tetrachloride with magnesium in a reactor, which may comprise a fluidised bed. The temperature in the reactor is above the melting point of magnesium, but below the melting point of magnesium chloride. The method produces particles comprising titanium which are removed from the reactor and processed in order to recover titanium particles generally having a particle size of greater than 500 μm.

The applicant has identified methods for producing composite materials suitable for use in the present invention. The composite material may be formed from at least one metal compound, the reaction being conducted under an excess of oxidant in the reactor during processing. The composite material will generally be in finely divided form and the method, generally, does not place significant weight on the exclusion of by-products in the composite material. The methods for the production of these composite materials are described in detail in a co-pending Australian provisional patent application with the title "METHOD FOR THE PRODUCTION OF A COMPOSITE MATERIAL USING EXCESS OXIDANT", filed on the same date as the present application. The contents of the co-pending application are incorporated herein in their entirety.

The recovery of product from the composite materials of the aforementioned provisional patent application is described in detail in a co-pending international patent application with the title "METHOD FOR RECOVERY OF METAL-CONTAINING MATERIAL FROM A COMPOSITE MATERIAL", filed on the same date as the present application. The content of the co-pending application is incorporated herein in their entirety.

The subject matter claimed herein is not limited to embodiments that solve any disadvantages or that operate only in environments such as those described above. Rather, this background is only provided to illustrate one exemplary technology area where some embodiments described herein may be practice.

SUMMARY OF INVENTION

As mentioned above, the present invention relates to methods that employ high surface area per volume reactive particulates, composite materials that comprise the high surface area per volume reactive particulates and the use of such composite materials in reactions.

According to one aspect of the invention there is provided a method of processing finely divided reactive particulates ($R_{Particulate}$) and forming a product comprising:

providing a composite material comprising finely divided reactive particulates ($R_{Particulate}$) dispersed in a protective matrix;

at least partially exposing the finely divided reactive particulates ($R_{Particulate}$); and forming the product.

For convenience, the term "composite material" will be used to describe a composite material that is a metal-salt composite, an alloy-salt composite or an inter-metallic-salt composite. That is, the term "composite material" as used herein is intended to include within its scope a composite material comprising at least a protective matrix, such as a salt, and (i) one species of finely divided reactive particulates ($R_{Particulate}$), such as a metallic element, (ii) two or more species of finely divided reactive particulates ($R_{Particulate}$), for example two or more metallic elements, or (iii) one or more species of finely divided reactive particulates ($R_{Particulate}$), such as one or more metallic elements, together with one or more other elements, such as one or more non-metallic elements.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

The finely divided reactive particulates ($R_{Particulate}$) are preferably selected from the group consisting of titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof. In certain preferred embodiments, the metal comprises a non-alkali/alkaline earth metal. The metal may comprise at least one of titanium, aluminium and vanadium.

According to preferred embodiments, the protective matrix comprises a metal halide ($M_RX$). The metal halide ($M_RX$) may comprise, for example, $MgCl_2$, $NaCl$, $KCl$, $LiCl$, $BaCl_2$, $CaCl_2$, $BeCl_2$, $AlCl_3$ or any combination thereof.

In certain embodiments, the composite material additionally comprises at least one of (i) one or more metal compounds ($M_FC_R$) in one or more oxidation states, and (ii) a reductant (R). The selection of the reductant (R), if present, is not particularly limited. In preferred embodiments, the reductant (R) comprises a metal reductant ($M_R$) selected from the group consisting of Mg, Na, K, Li, Ba, Ca, Be, Al and any combination thereof. In certain embodiments, the composite material comprises up to 20 wt % reductant (R). The composite may more generally comprise up to 3 wt % reductant (R)

If present, the one or more metal compounds ($M_FC_R$) in one or more oxidation states may comprise one or more metal halides ($M_FX$). For example, metal halides ($M_FX$) may be selected from halides of titanium, aluminium, vanadium, chromium, niobium, molybdenum, zirconium, silicon, boron, tin, hafnium, yttrium, iron, copper, nickel, manganese, palladium, tungsten, cadmium, zinc, silver, cobalt, bismuth, tantalum, magnesium, beryllium, scandium, ruthenium and the rare earths or a combination of any two or more thereof.

The composite material may be in the form of particles. The particles may be spherical, or any shape. They may be regular or irregular in shape. The particles may have a predetermined particle size predicated by the utility of the particle size in the process or subsequent processing. The preferred particle size is therefore not particularly limited. The morphology and size of the particles generally corresponds with the morphology and size of the powder particles of the starting materials. Thus, a 5 μm precursor particle size generally produces a product particle size in the order of about 5 μm, although in some instances a reduction of particle size may be expected, for example by up to about 50%. It is considered that the technique of particulate exposure to the component to be reacted with will impact on the preferred particle size.

The finely divided reactive particulates ($R_{Particulate}$) generally have a particle size of up to about 1 micron. The surface area to volume ratio of the finely divided reactive particulates ($R_{Particulate}$) in the protective matrix is preferably greater than 6 m²/mL.

In that regard, taking as an example where the composite material is formed by contacting Mg with $TiCl_4$ in a fluidised bed reactor to form Ti metal dispersed in a $MgCl_2$ matrix, it is thought that at the extreme lower limit of particle size, one molecule of $TiCl_4$ may react with one atom of Mg and produce $MgCl_2$ and $TiCl_2$. Thereafter, one more atom of Mg reacts with $TiCl_2$ and forms a second $MgCl_2$ and a single Ti atom. Therefore, at its limit, it is envisaged that the finely divided reactive particulates ($R_{Particulate}$) may be present in the protective matrix on an atomic scale. Such examples would represent true "primary particles" of the finely divided reactive particulates ($R_{Particulate}$). In practice, there is the inherent desire on the part of the finely divided reactive particulates ($R_{Particulate}$) to nucleate or agglomerate (and possibly sinter), especially at nascent sites and in the presence of some local heating, mixing, possible electronic transfer through partially melted salt, etc. As such, it is considered that there may be many atoms coalescing together to form the more realistically viable "primary particles" that would be observed under analysis. These particles may be extremely small, for example on the nano-scale. At some point, however, further aggregation is not possible because of, according to this embodiment at least, "freezing" of the $MgCl_2$ to encapsulate the Ti in its current state of agglomeration, resulting in a frozen sea of $MgCl_2$ with homogeneously dispersed titanium particles.

Accordingly, in this particular embodiment, an ultrahigh surface area metal with no oxide barrier layer is completely protected from forming larger particles or otherwise reacting unless the $MgCl_2$ is removed. However, when the protective matrix, in this case $MgCl_2$ is removed (for example by melting), the titanium particles are free to move around and further aggregate and form larger structures, such as shells of Ti. These may be considered "secondary particles". It will be appreciated that these comments are equally relevant to the extreme upper limit of the surface area to volume ratio of the finely divided reactive particulates ($R_{Particulate}$) in the protective matrix.

Another advantageous characteristic of the reactive particulates of these preferred embodiments of the invention is the lack of a protective oxide layer. The reactive particulates of these embodiments have, at most, a minimal activation barrier, which correlates with a lower activation energy (increase in reactivity) of the reactive particulates. In addition to the above advantage, generally small particles are highly pyrophoric. The composite material of the preferred embodiments of the invention is, comparatively, not. For conventional metal powders of approximately <10 um, pyrophoricity becomes a major issue, but can be serious even at much larger sizes (>100 um) under some conditions. Furthermore, the presence of an oxygen barrier layer on conventional metal powders may reduce purity and grade, particularly for Ti for example, due to the oxygen content in the final product. The protective matrix of the composite material of the invention may advantageously overcome, or at least ameliorate these issues.

The step of at least partially exposing the finely divided reactive particulates is not particularly limited. The reactive particulates ($R_{Particulate}$) may be exposed at or near the surface of the composite material. In some embodiments exposure is defined to ensure that the protective matrix is predominantly removed. In other embodiments exposure is defined to ensure that the protective matrix is at least partially retained. In other embodiments exposure is defined to ensure that the protective matrix becomes at least temporarily permeable.

In one embodiment, the exposure step comprises subjecting the composite material to conditions that result in volatilisation of the matrix. For example, the conditions may result in sublimation of the matrix.

According to one embodiment, the protective matrix is removed from the composite material by vacuum distillation. For example, the vacuum distillation may be carried out under inert conditions, such as under argon gas. If so, the inert (e.g. argon) gas is added, as a barrier gas, at a rate that is dependent on the scale of the operation and vacuum applied. For example, this may be at a rate of 5 mg/min. According to this embodiment, the vacuum distillation may be conducted at a pressure of from 0.01 to 0.015 kPa. The vacuum distillation is preferably conducted at a temperature above the sublimation temperature of the protective matrix.

In one particular embodiment, the finely divided reactive particulates ($R_{Particulate}$) comprise at least titanium and the protective matrix comprises magnesium chloride and the vacuum distillation is conducted at a temperature of from 700° C. to 950° C.

In an alternative embodiment, the exposure step comprises melting the matrix, thus at least partially exposing the finely divided reactive particulates ($R_{Particulate}$). For example, depending on the components of the composite material, melting may be conducted at a temperature below the individual melting temperatures of each component of the protective matrix by formation of a eutectic.

In another embodiment, the exposing step comprises attrition of the matrix, thus at least partially exposing the finely divided reactive particulates ($R_{Particulate}$). For example, attrition may occur in a mill, grinder or any operable equipment where attrition occurs.

In another embodiment, the exposing step comprises treatment in a solid-solid, solid-liquid, or solid-vapour contact device, thus at least partially exposing the finely divided reactive particulates ($R_{Particulate}$) at the surface of the composite material. For example, contact may occur in a fluidised bed or stirred reactor.

The exposed particulate material may be subjected to conditions favourable to the formation of the product. This includes selection of appropriate temperature and pressure. It may be appreciated that this provides a degree of flexibility regarding the phase of both protective matrix and any additional material being used to form the product, discussed in more detail below, which is not available under conditions required to form the finely divided reactive particulates ($R_{Particulate}$). It should also be appreciated given the finely divided nature of the reactive particulates that the reaction may proceed via any combination of phases of reactive particulates and any other material present.

Forming the product may comprise exposing the exposed finely divided reactive particulates ($R_{Particulate}$) to another material. The selection of the other material is not particularly limited. It is considered, though, that the other material may advantageously be selected from the group consisting of titanium, aluminium, vanadium, chromium, niobium, molybdenum, zirconium, silicon, boron, tantalum, carbon, tin, hafnium, yttrium, iron, copper, nickel, bismuth, manganese, palladium, tungsten, cadmium, zinc, silver, cobalt, magnesium, beryllium, scandium, ruthenium and the rare earths or a combination of any two or more thereof, particularly chromium, silver, copper, manganese, cobalt, scandium, niobium, cadmium and nickel. However, it should be noted that if the other material is not present, the exposed reactive particulates ($R_{Particulate}$) may themselves form the product.

The step of at least partially exposing surfaces of the finely divided reactive particulates ($R_{Particulate}$) may result in at least one of redox reaction, non-redox reaction, agglomeration, alloying and cold-welding. For example, the finely divided reactive particulates ($R_{Particulate}$) may be highly reductive and, on exposure to the other material if present, reduce the other material to a reduced form. For example in the formation of compounds such as titanium carbide from titanium (i.e. as the finely divided reactive particulates ($R_{Particulate}$)) and carbon, a reduction of carbon is observed as Ti goes from $Ti^0$ to $Ti^{4+}$ and C from $C^0$ to $C^{4-}$. In other examples, exposure of the surfaces of the finely divided reactive particulates ($R_{Particulate}$) causes the finely divided reactive particulates ($R_{Particulate}$) to agglomerate or alloy with the other material. In that regard, in certain embodiments, the finely divided reactive particulates ($R_{Particulate}$) may agglomerate or alloy to one another. As another specific example, exposure of the finely divided reactive particulates ($R_{Particulate}$) provides sites for cold-welding with the other material. An advantage of certain embodiments of the invention in this respect is that such reactions may be conducted at substantially reduced temperature due to the lack of any oxygen barrier layer on the finely divided reactive particulates ($R_{Particulate}$) (i.e. there is no need for high temperature treatment to remove such barrier layers).

The present invention further relates to a composite material for use in the method described above, the composite material comprising finely divided reactive particulates ($R_{Particulate}$) dispersed in a protective matrix.

The preferred features described above are also applicable in respect of this aspect of the invention. For example, the finely divided reactive particulates ($R_{Particulate}$) may comprise a metal selected from the group consisting of titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof, particularly titanium, aluminium and vanadium. The protective matrix may comprise a metal halide ($M_RX$), for example selected from the group consisting of $MgCl_2$, NaCl, KCl, LiCl, $BaCl_2$, $CaCl_2$, $BeCl_2$, $AlCl_3$ and any combination thereof.

Again, the composite material may be in the form of particles, which may be spherical, regular or irregular in shape. The particles may have a predetermined particle size predicated by the utility of the particle size in the process or subsequent processing. Likewise, the finely divided reactive particulates ($R_{Particulate}$) may have a particle size of up to about 1 micron. The surface area to volume ratio of the finely divided reactive particulates ($R_{Particulate}$) in the protective matrix may be greater than 6 $m^2/mL$.

The invention further relates to use of a composite material comprising finely divided reactive particulates ($R_{Particulate}$) dispersed in a protective matrix in the formation of a product, wherein the finely divided reactive particulates ($R_{Particulate}$) are at least partially exposed in the formation of the product.

Once again, the preferred features as described in the immediately preceding paragraphs are equally applicable to this aspect of the invention and are incorporated herein by reference.

The formation of the product may comprise at least one of redox reaction, non-redox reaction, agglomeration, alloying and cold-welding. Again, the formation of the product may comprise exposing the exposed reactive particulates ($R_{Particulate}$) to another material, generally selected from those previously mentioned.

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF ACCOMPANYING DRAWINGS

To further clarify various aspects of some embodiments of the present invention, a more particular description of the invention will be rendered by references to specific embodiments thereof, which are illustrated in the appended drawings. It should be appreciated that these drawings depict only typical embodiments of the invention and are therefore not to be considered limiting on its scope. The invention will be described and explained with additional specificity and detail through the accompanying drawings in which.

DETAILED DESCRIPTION OF THE PREFERRED EMBODIMENTS

Hereinafter, this specification will describe the present invention according to the preferred embodiments. It is to be understood that limiting the description to the preferred embodiments of the invention is merely to facilitate discussion of the present invention and it is envisioned without departing from the scope of the appended claims.

Figure 1:
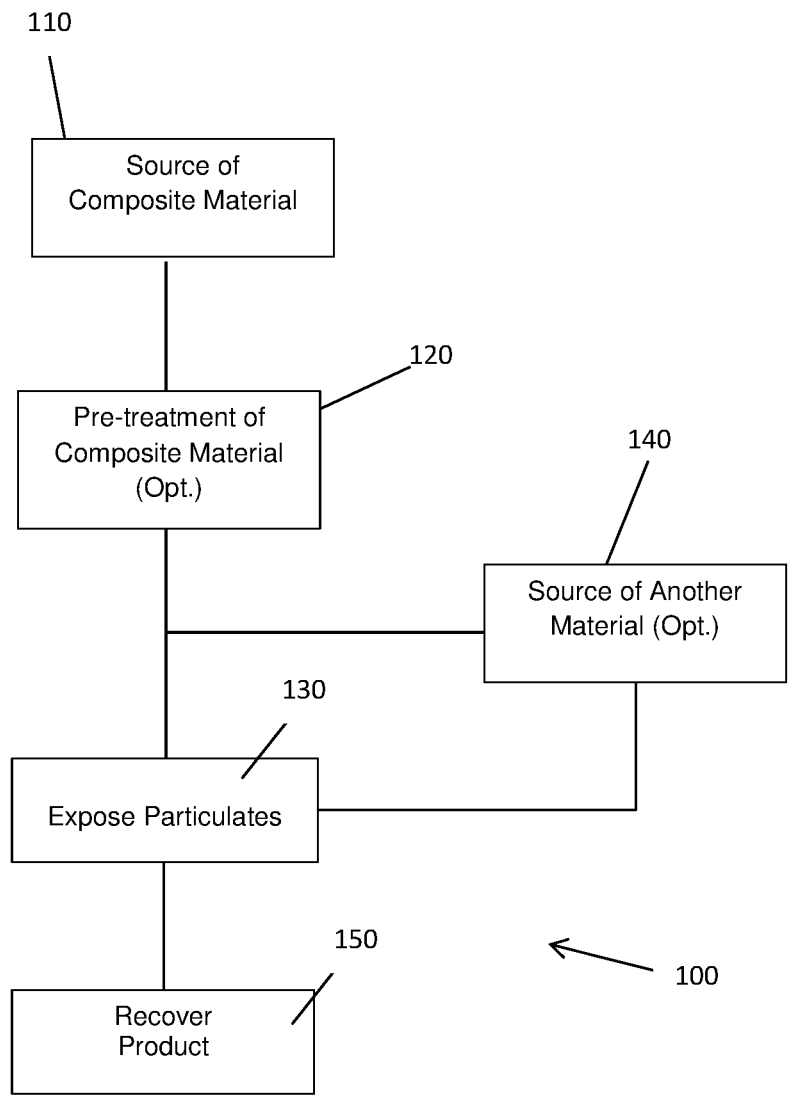
FIG. 1 illustrates a flow chart of a method according to an embodiment of the invention.

Referring to FIG. 1, a method 100 for forming a product through the exposure of finely divided reactive particulates ($R_{Particulate}$) dispersed in a protective matrix is illustrated. The method involves providing a source of a composite material comprising finely divided reactive particulates ($R_{Particulate}$) dispersed in a protective matrix 110. The composite material may be pre-treated 120 if desired, depending on the particular circumstances. For example, pre-treatment may comprise blending, compacting, milling or grinding of the composite material, provided this does not substantially expose the finely divided reactive particulates ($R_{Particulate}$).

The finely divided reactive particulates ($R_{Particulate}$) of the composite material are at least partially exposed 130. This may include partially, predominantly or completely removing the protective matrix, or rendering the matrix temporarily permeable. The particulates are highly reactive and have a high surface area per volume. As such, exposure of the particulates, which may be through volatilisation of the protective matrix of the composite material (e.g. by vacuum distillation), melting of the matrix, milling, grinding and/or attrition of the composite material, treatment in a solid-solid, solid-liquid or solid-vapour contacting device (e.g. a fluidised bed), generally sets in motion the formation of the product.

In its broadest form, the invention may provide a product formed from the finely divided reactive particulates ($R_{Particulate}$) of the composite material. That is, through the agglomeration or alloying of the finely divided reactive particulates ($R_{Particulate}$). The invention also considers the addition of another material 140, which may be a combination of other materials, prior to and/or during the exposure step 130. The other material(s) may be a material that takes part in a redox or non-redox reaction with the finely divided reactive particulates ($R_{Particulate}$). It may clod-weld with the finely divided reactive particulates ($R_{Particulate}$).

Following the formation of the desired product, the product may be recovered 150.

EXAMPLES

The following examples are provided for exemplification only and should not be construed as limiting on the invention in any way.

Example 1

25 g of composite material, black in colour, in finely ground particulate form comprising a matrix of magnesium chloride, titanium metal, magnesium and quantities of titanium sub-halides ($TiCl_2$ and $TiCl_3$) was mixed with a quantity of 6.9 g of Chromium tri-chloride ($CrCl_3$), then placed in a vessel made from stainless steel. The vessel was placed under vacuum at a pressure of approximately 0.01 kPa. An argon purge was supplied at a rate of 10 mg/min. The vessel was then heated externally to a temperature of 900° C. at a heating rate of 31° C. per minute. The vessel was then left at a temperature of 900° C. for one hour before being cooled to room temperature.

Under the prevailing conditions in this process titanium, chromium and chromium chloride would have been in solid phase.

The vessel was purged with air and the remnant material was recovered from the vessel, comprising approximately 5 g of metal with a composition of 70% titanium-30% chromium. The metal was in the form of loosely sintered particles. The metal proportions observed represent a high extent of reduction of $CrCl_3$ to metal by the finely divided titanium metal in the composite.

Example 2

A reaction vessel made from stainless steel was purged with high purity argon and heated externally to 680° C. The system was charged with 500 g of titanium composite particles as a seed material. The system was allowed to reach an internal temperature of 675° C. At this point the component to be reduced was introduced.

Vanadium tetrachloride was supplied at a rate of 50 grams per hour. The addition of the component to be reduced to the reactor increased the temperature in the reactor for a short period consistent with the exothermic nature of the reactions occurring at exposed reductant sites.

Example 3

A reaction vessel made from stainless steel was purged with high purity argon and heated externally to 680° C. The system was charged with 500 g of titanium-aluminium composite particles as a seed material. The system was allowed to reach an internal temperature of 655° C. At this point reactant feeds were introduced.

Titanium tetrachloride was supplied at a rate of approximately 150 grams per hour. The addition of the component to be reduced to the reactor increased the temperature in the reactor for a short period consistent with the exothermic nature of the reactions occurring at exposed reductant sites.

Example 4

20 g of composite material, black in colour, in finely ground particulate form comprising a matrix of magnesium chloride, titanium metal, magnesium and quantities of titanium sub-halides ($TiCl_2$ and $TiCl_3$) was mixed with a quantity of 7.4 g of silver chloride (AgCl), then placed in a vessel made from stainless steel. The vessel was placed under vacuum at a pressure of approximately 0.01 kPa. An argon purge was supplied at a rate of 10 mg/min. The vessel was then heated externally to a temperature of 900° C. at a heating rate of 31° C. per minute. The vessel was then left at a temperature of 900° C. for one hour before being cooled to room temperature.

Under the prevailing conditions in this process titanium and silver would have been in solid phase, while silver chloride would have melted at 455° C. and remained in the liquid phase until consumed.

The vessel was purged with air and the remnant material was recovered from the vessel, comprising approximately 8.35 g of metal with a composition of 60% silver-40% titanium. The metal was in the form of loosely sintered particles. The metal proportions observed represent a high extent of reduction of AgCl to metal by the finely divided titanium metal in the composite.

Figure 2:
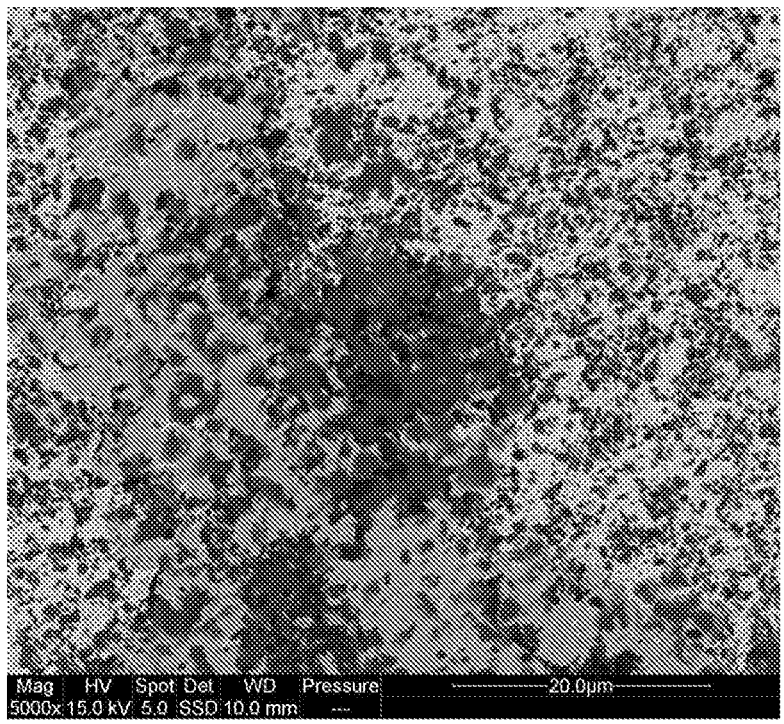
FIG. 2 is a SEM micrograph of microstructure of Ag—Ti metallic material recovered in Example 4

FIG. 2 shows a SEM micrograph of the recovered material. A high degree of intermixing of the different metallic materials is evident and would be dependent on the degree of mixing prior to reaction.

Example 5

2 g of composite material, black in colour, in finely ground particulate form comprising a matrix of magnesium chloride, predominantly vanadium metal, magnesium and quantities of vanadium sub-halides was ground with a quantity of 0.4 g of Chromium tri-chloride ($CrCl_3$). 50 mg of the ground material was then placed in an alumina cup and placed within a vacuum furnace. The furnace was placed under vacuum at a pressure of approximately 0.01 kPa. An argon purge was supplied at a rate of 2 mg/min. The furnace was then heated to a temperature of 900° C. at a heating rate of 10° C. per minute. The furnace was then left at a temperature of 900° C. for one hour before being cooled to room temperature.

Under the prevailing conditions in this process vanadium, chromium and chromium chloride would have been in solid phase.

The vessel was purged with air and the remnant material was recovered from the vessel, comprising approximately 12 mg of metal with a composition of 70% vanadium-30% chromium. The metal was in the form of loosely sintered particles. The metal proportions observed represent a high extent of reduction of $CrCl_3$ to metal by the finely divided titanium metal in the composite.

Example 6

2 g of composite material, black in colour, in finely ground particulate form comprising a matrix of magnesium chloride, predominantly zirconium metal, magnesium and quantities of zirconium sub-halides was ground with a quantity of 0.4 g of Chromium tri-chloride ($CrCl_3$). 50 mg of the ground material was then placed in an alumina cup and placed within a vacuum furnace. The furnace was placed under vacuum at a pressure of approximately 0.01 kPa. An argon purge was supplied at a rate of 2 mg/min. The furnace was then heated to a temperature of 900° C. at a heating rate of 10° C. per minute. The furnace was then left at a temperature of 900° C. for one hour before being cooled to room temperature.

Under the prevailing conditions in this process zirconium, chromium and chromium chloride would have been in solid phase.

The vessel was purged with air and the remnant material was recovered from the vessel, comprising approximately 12 mg of metal with a composition of 80% zirconium-20% chromium. The metal was in the form of loosely sintered particles.

The metal proportions observed represent a high extent of reduction of $CrCl_3$ to metal by the finely divided titanium metal in the composite.

Unless the context requires otherwise or specifically stated to the contrary, integers, steps or elements of the invention recited herein as singular integers, steps or elements clearly encompass both singular and plural forms of the recited integers, steps or elements.

It will be appreciated that the foregoing description has been given by way of illustrative example of the invention and that all such modifications and variations thereto as would be apparent to persons of skill in the art are deemed to fall within the broad scope and ambit of the invention as herein set forth.

The invention claimed is:

1. A method of processing finely divided reactive particulates ($R_{Particulate}$) and forming a product comprising:
   providing a solid composite material comprising
   (a) a protective matrix,
   (b) finely divided reactive particulates ($R_{Particulate}$) dispersed in the protective matrix, and
   (c) at least one of (i) one or more metal compounds (MPCR) in one or more oxidation states, and (ii) a reductant (R),
   with the finely divided reactive particulates ($R_{Particulate}$) having a particle size of up to 1 micron and the surface area to volume ratio of said finely divided reactive particulates ($R_{Particulate}$) in said protective matrix being greater than 6 $m^2$/mL,
   with the finely divided reactive particulates ($R_{Particulate}$) comprising a metal or a metalloid selected from the group consisting of titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof, and
   with the protective matrix comprising a metal halide (MRX) selected from the group consisting of MgCl2, NaCl, KCl, LiCl, BaCl2, CaCl2, BeCl2, AlCl3 and any combination thereof;
   at least partially exposing said finely divided reactive particulates ($R_{Particulate}$) by subjecting said composite material to vacuum distillation, resulting in volatilisation of said matrix; and
   forming said product.

2. A method according to claim 1, wherein said composite material comprises up to 20 wt % of said reductant (R).

3. A method according to claim 1, wherein said composite material is in the form of particles.

4. A method according to claim 1, wherein said conditions result in sublimation of said matrix.

5. A method according to claim 1, wherein said vacuum distillation is conducted under inert conditions.

6. A method according to claim 5, wherein said inert conditions are under argon gas at a pressure of from 0.01 to 0.015 kPa.

7. A method according to claim 1, wherein said vacuum distillation is conducted at a temperature above the sublimation temperature of said protective matrix.

8. A method according to claim 1, wherein said finely divided reactive particulates (RParticulate) comprise at least titanium and said protective matrix comprises magnesium chloride and said vacuum distillation is conducted at a temperature of from 700° C. to 950° C.

9. A method according to claim 1, wherein said step of at least partially exposing said finely divided reactive particulates (RParticulate) comprises melting said matrix.

10. A method according to claim 1, wherein said step of at least partially exposing said finely divided reactive particulates (RParticulate) comprises milling, grinding and/or attrition of said composite material.

11. A method according to claim 1, wherein said step of at least partially exposing said finely divided reactive particulates (RParticulate) comprises treatment in a solid-solid, solid-liquid or solid-vapour contacting device.

12. A method according to claim 11, wherein said contacting device is a fluidised bed.

13. A method according to claim 1, wherein forming said product comprises exposing the exposed finely divided reactive particulates (RParticulate) to another material selected from the group consisting of titanium, aluminium, vanadium, chromium, niobium, molybdenum, zirconium, silicon, boron, tantalum, carbon, tin, hafnium, yttrium, iron, copper, nickel, bismuth, manganese, palladium, tungsten, cadmium, zinc, silver, cobalt, magnesium, beryllium, scandium, ruthenium and the rare earths or a combination of any two or more thereof.

14. A method according to claim 1, wherein said step of forming said product comprises at least one of redox reaction, non-redox reaction, agglomeration, alloying and cold-welding.

15. A method of processing finely divided reactive particulates ($R_{Particulate}$) and forming a product comprising:
   providing a solid composite material comprising
   (a) a protective matrix,
   (b) finely divided reactive particulates ($R_{Particulate}$) dispersed in the protective matrix, and
   (c) at least one of (i) one or more metal compounds (MPCR) in one or more oxidation states, and (ii) a reductant (R),
   with the finely divided reactive particulates ($R_{Particulate}$) having a particle size of up to 1 micron and the surface area to volume ratio of said finely divided reactive particulates ($R_{Particulate}$) in said protective matrix being greater than 6 $m^2$/mL,
   with the finely divided reactive particulates ($R_{Particulate}$) comprising a metal or a metalloid selected from the group consisting of titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof, and with the protective matrix comprising a metal halide (MRX) selected from the group consisting of $MgCl_2$, $NaCl$, $KCl$, $LiCl$, $BaCl_2$, $CaCl_2$, $BeCl_2$, $AlCl_3$ and any combination thereof;

at least partially exposing said finely divided reactive particulates ($R_{Particulate}$) by subjecting said composite material to milling, grinding and/or attrition of said composite material; and forming said product.

* * * * *